United States Patent [19]
Hobbs

[11] 3,989,111
[45] Nov. 2, 1976

[54] DIGGER-SHAKER
[76] Inventor: Oliver K. Hobbs, Box 1306, Suffolk, Va. 23434
[22] Filed: Mar. 8, 1971
[21] Appl. No.: 122,029

[52] U.S. Cl. ............................... 171/101; 171/127
[51] Int. Cl.² ........................................ A01D 29/00
[58] Field of Search ............ 171/101, 116, 14, 126, 171/127, 130; 56/119, 192, 317, 370; 198/137, 208

[56] References Cited
UNITED STATES PATENTS

| | | | |
|---|---|---|---|
| 919,281 | 4/1909 | Camp | 171/126 |
| 1,113,853 | 10/1914 | Wood | 56/317 |
| 1,285,633 | 11/1918 | Cummings | 171/116 |
| 1,814,029 | 7/1931 | Free | 171/116 |
| 2,828,825 | 4/1958 | Johnson | 171/130 |
| 2,997,114 | 8/1961 | Hines | 171/101 |
| 3,083,776 | 4/1963 | Carter et al. | 171/101 |
| 3,227,276 | 1/1966 | Leighton et al. | 171/14 |
| 3,353,342 | 11/1967 | Hill et al. | 171/127 |

*Primary Examiner*—Russell R. Kinsey
*Attorney, Agent, or Firm*—Clelle W. Upchurch

[57] ABSTRACT

A digger-shaker adapted to dig two rows of growing peanut laden plants and shake soil therefrom is provided with two carrier belts disposed at the rear thereof and spaced transversely from each other adapted to intercept the peanut plants as they are discharged by the digger-shaker, support them nearer the root portions than the tops of the foliage, move them rearwardly from the digger-shaker while thus supported whereby the foliage of the plants falls inwardly between the spaced carriers until not above horizontal, and then discharge the plants to the ground with the peanuts spaced away from the ground. The digger-shaker is also provided with an improved conveyor for elevating the peanut laden plants in which a front idler wheel is not journaled on the frame with an outwardly projecting bearing and additional idler wheels direct the conveyor along an irregular path to improve its soil removing properties.

19 Claims, 8 Drawing Figures

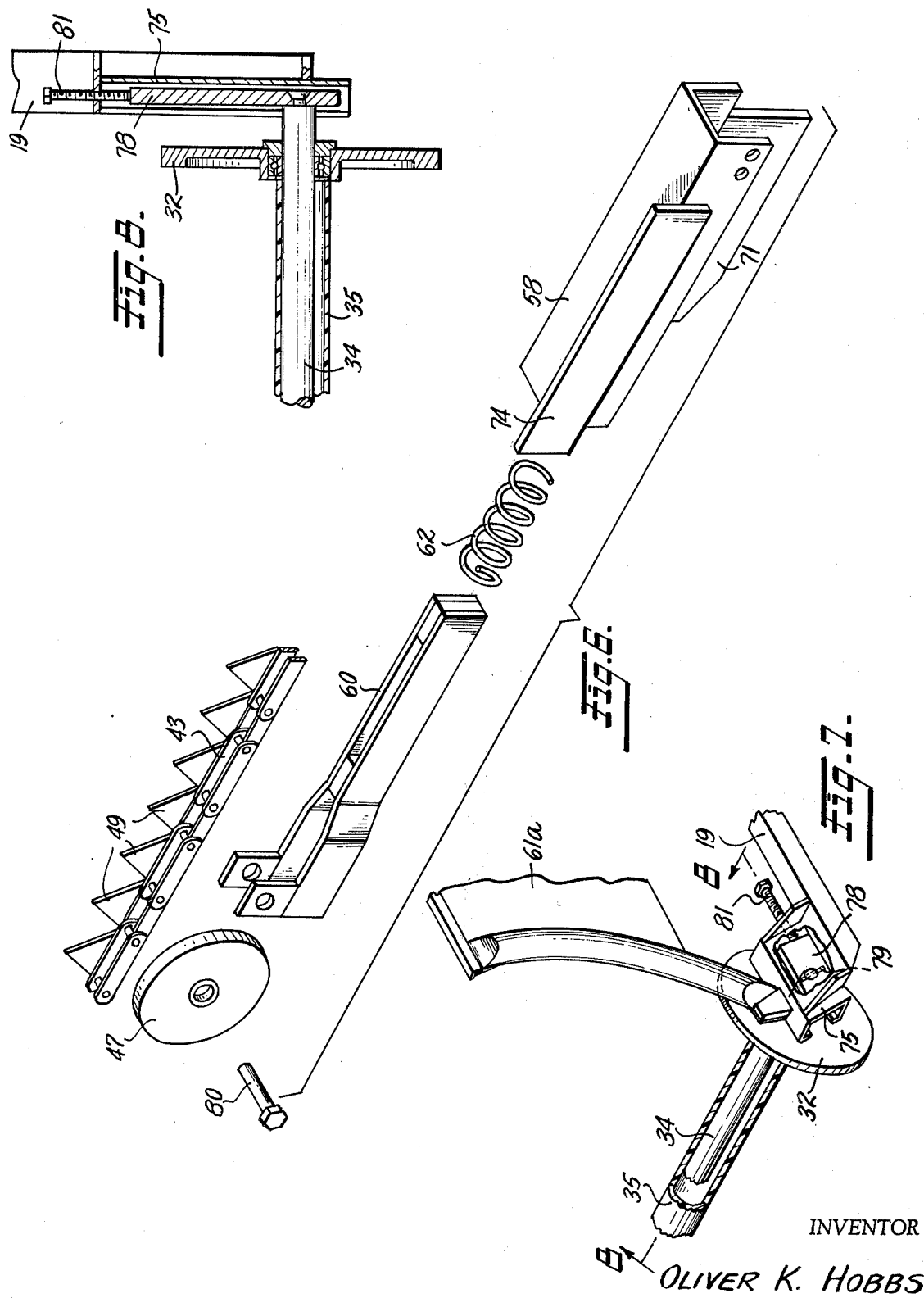

DIGGER-SHAKER

This invention relates generally to apparatus for harvesting peanuts and more particularly to a novel and improved apparatus for digging peanut laden plants and for depositing the plants in windrows over the soil in which they grew with the peanuts spaced away from the soil.

Various types of apparatus have been proposed heretofore for digging peanut laden plants, shaking soil which clings to the plants therefrom and then depositing the plants in windrows where they are left to dry in the sun. Such apparatus is referred to as a peanut digger-shaker. Some of the digger-shakers elevate the freshly dug plants with kickers of the type disclosed in U.S. Pat. No. 3,473,615. Other digger-shakers elevate the plants with a continuous conveyor comprising a plurality of spaced transverse bars carried by sprocket chains. One apparatus of this type which has proven to be commercially successful is described in my U.S. Pat. No. 3,319,720.

It has also been recognized that peanuts are dried more quickly and more efficiently while the plants are lying in windrows if they are not under the foliage and next to the ground. Various kinds of attachments for the digger-shakers designed to turn the plants over before they are deposited in windrows have been disclosed. For example, a grate type conveyor attached to the rear portion of a digger-shaker is described in U.S. Pat. No. 3,260,314. A plurality of tines mounted on bars extend upwardly through the slots in the grate and move the plants to the rear where they fall therefrom. This particular type of apparatus might be somewhat successful in harvesting peanut plants which can be elevated individually as disclosed in the drawing of the patent. However, most peanut plants growing in a row become entwined with each other and remain that way after digging. Consequently, they are elevated by the digger-shaker as a continuous band of plants. Even though the grate tends to invert the band of plants, the band tends to twist itself back with the peanuts adjacent the ground as they fall from the grate to the ground. Another device to be attached to the rear of a digger-shaker to invert the plants is composed of a plurality of spaced bent rods over which the peanut plants slide before falling to the ground. Devices of this type are disclosed in U.S. Pat. Nos. 3,454,100 and 3,473,615 but have the disadvantage that the plants cling about the rods in dry weather and don't slide very well over them in wet weather. Such a device is particularly disadvantageous with digger-shakers having wheels or kickers for elevating the plants because there is a tendency for portions of the plants to fall between the rods and become wound about the wheels or kickers. Still another inverter apparatus is disclosed in U.S. Pat. No. 3,420,047 but it requires a disc cutter or colter to cut any portions of the plant's vines which extend from one row to the other in order that the bands of plants can be deposited separately one on the other behind the apparatus. Failure to separate the foliage of one row of plants from the other frequently results in entanglements which require that the apparatus be stopped for cleaning. A similar apparatus disclosed in U.S. Pat. No. 3,387,445 has the disadvantage that plants become wound about the top of the conveyor which elevates the plants over the digger-shakers.

It is therefore an object of this invention to provide a means for inverting peanut plants and for depositing the inverted plants in a single windrow which is devoid of the disadvantages of the prior art devices. Another object of the invention is to provide a novel and improved device adapted to be connected to a peanut digger-shaker which will direct continuous bands of two rows of freshly dug peanut laden plants into a single windrow with the peanuts spaced away from the ground. Still another object of the invention is to provide a peanut digger-shaker having an improved conveyor for shaking dirt from the plants and for elevating them prior to windrowing. A further object of the invention is to provide a novel and improved digger-shaker combining an improved elevating conveyor and an improved device for placing two rows of peanut plants in a single windrow with the peanuts spaced away from the ground.

Other objects and advantages of the invention will be appreciated and become apparent from the following description with reference to the accompanying drawing in which FIG. 1 is a plan view of one embodiment of the invention;

FIG. 6 is an exploded view of the embodiment of a tensioning device for the conveyor illustrated in FIG. 4;

FIG. 7 is an enlarged fragmentary perspective view of the front idler wheel assembly of a preferred embodiment; and FIG. 8 is a section along the line 8—8 of FIG. 7.

Generally speaking, the foregoing objects and others are accomplished in accordance with this invention by providing an apparatus for harvesting peanuts having means for digging peanut plants and for elevating the plants thereover with two spaced belt type carriers or conveyors disposed at the rear of the harvesting apparatus where each will intercept one band of plants as it falls from its elevated position towards the ground, support it adjacent the plant roots and transport the band rearwardly while thus supported but while a predominant amount of the foliage is unsupported therebetween. As the bands of entwined plants drop from the belt type carriers, they are twisted or rotated to a position where the unsupported foliage strikes the ground first and the peanuts are spaced away from the ground. More specifically, a peanut digger-shaker is provided which has two spaced belt carriers disposed at the rear thereof and adapted to catch continuous bands of peanut laden plants as they drop from the elevating conveyor mechanism of the digger-shaker, support the plants and push them rearwardly and towards each other as unsupported foliage of the bands of plants falls inwardly between the two carriers, and then discharge the plants with the peanuts spaced from the ground in a single windrow behind the apparatus. This invention also provides a digger-shaker with an elevating conveyor which rotates along a canted path and thereby more efficiently shakes dirt from plants as they are elevated prior to windrowing. A novel means of mounting the elevating conveyor of the digger-shaker at its forward end avoids accumulation of vines, weeds and other material thereabout.

Figure 1:
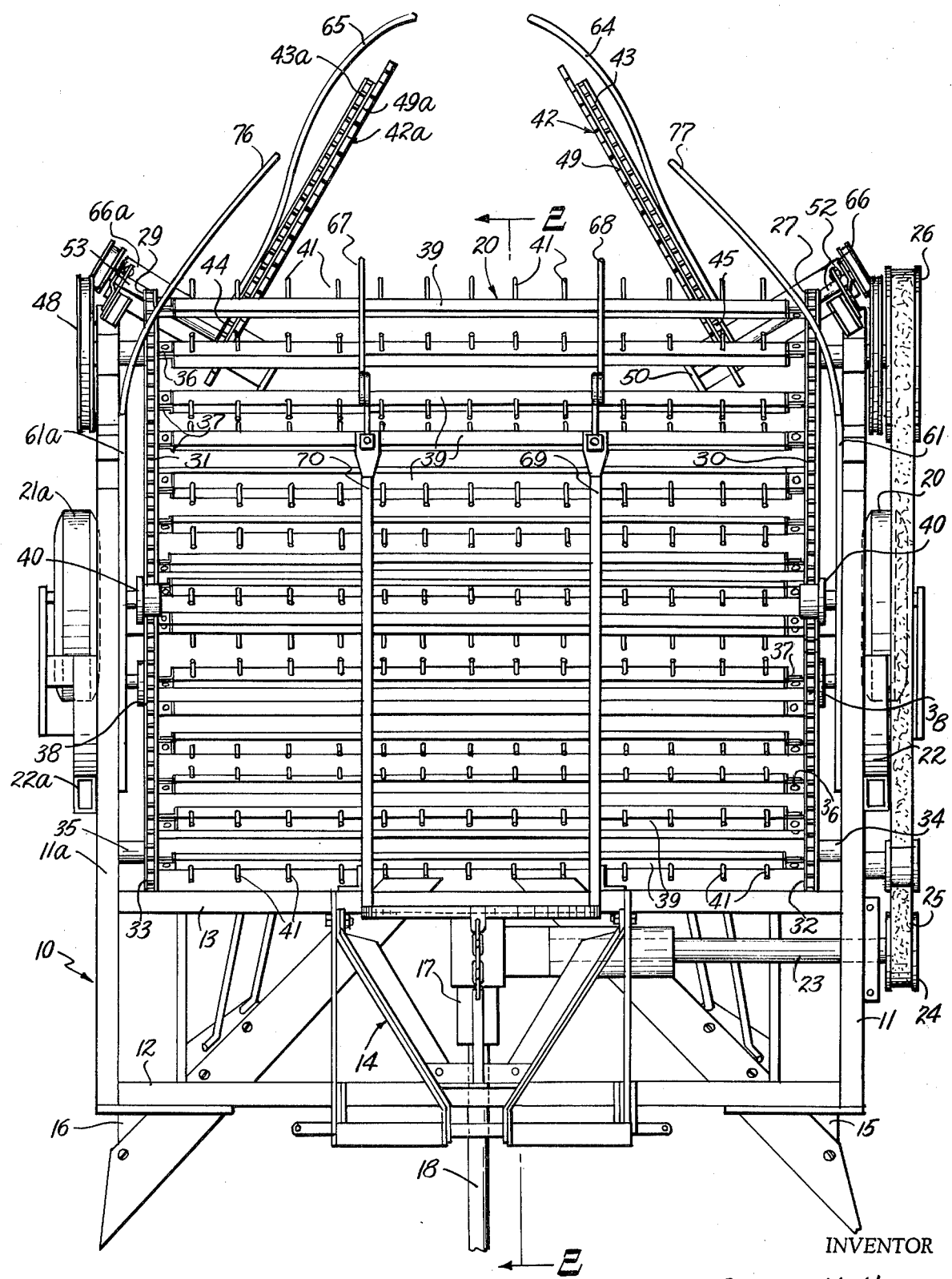
Figure 2:
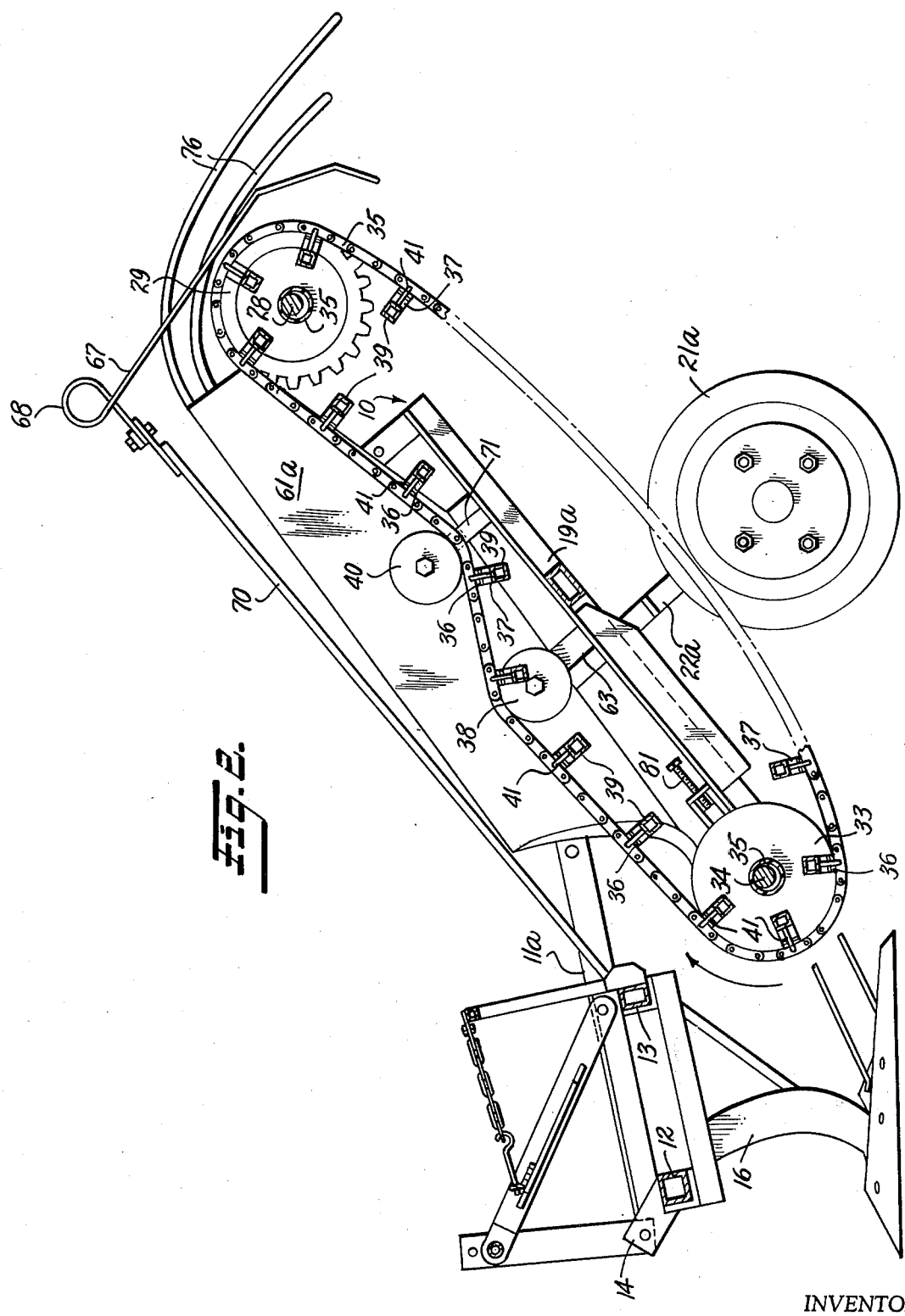
FIG. 2 is a longitudinal section taken along the line 2—2 of FIG. 1 with the inverting mechanism omitted.

Referring now to the drawing and particularly to FIGS. 1 and 2, the preferred embodiment has a frame 10 with side rails 11 and 11a fixedly attached at their front ends to transverse members 12 and 13. The apparatus may be connected to a tractor with a conventional three-point tractor hitch 14. Plow assemblies 15 and 16 are mounted on the frame 10 and are supported thereby in the proper spaced relationship to dig peanut laden plants from two rows of growing plants as the apparatus is pulled thereover. Gear box 17 is also supported by the frame 10 and transmits rotary motion from a tractor or the like through a conventional power take-off shaft 18 to belts which drive the conveyor mechanisms of the apparatus. Gauge wheels 21 and 21a are mounted on struts 22 and 22a which are rigidly attached to side rails 11 and 11a, and support the apparatus as it rolls over the ground. Sub-frame members 19 and 19a extend obliquely downward and forward from where they are fixedly attached at the rear to side rails 11 and 11a.

Conveyor 20 is rotated by the drive mechanism composed of gear box 17, shaft 23, sheave 24, belt 25, sheave 26, sprocket wheel 27, shaft 28, and sprocket wheel 29 with belt 25 traveling in the direction indicated by the arrow in FIG. 1. Sprocket chains 30 and 31 are rotated by sprocket wheels 27 and 29 about a pair of idler wheels 32 and 33 journaled on shaft 34. The ends of shaft 34 are fixedly secured against rotation on sub-frame members 19 and 19a. As illustrated with respect to sub-frame 19 in FIG. 7, the end of shaft 34 is secured to bar shaped member 78 with roll pin 79 within housing 75. The tension on conveyor 20 may be adjusted with set screw 81 which presses against bar 78. Idlers 32 and 33 are journaled to shaft 34 at points spaced inwardly from the ends of shaft 34 and from sub-frame members 19 and 19a as illustrated in FIG. 8. A plastic sleeve 35 loosely covers shaft 34 substantially throughout its length between idlers 32 and 33 to protect it against rust and to discourage peanut vines and weeds from becoming wound about the shaft. Furthermore, wet soil is not as likely to accumulate on the plastic sleeve as rapidly as it would on the metal shaft. Vines are more likely to cling to a roughened surface caused by rusting than about a plastic sleeve.

It is to be noted from FIGS. 7 and 8 that the idler assemblies at the front ends of chains 30 and 31 do not have bearings journaled on frames 19 and 19a. Likewise, no chain shield is required about idlers 32 and 33. It has been found that accumulation of vines, grass and weeds about the idlers is avoided by eliminating these customary bearings and shields and by journaling the wheels 32 and 33 to shaft 34 as shown in FIG. 8. Side shields 61 and 61a terminate back of wheels 32 and 33. In prior art devices having the front idler wheels journaled to the frame, the bearings are exposed at the sides of the apparatus and shields which extend around the front ends of the idlers are required. Accumulation of plants between the shield and the ground below the idler wheel often becomes so great that the apparatus is lifted from the ground.

Transversely extending bars 39 are spaced longitudinally along the loops of sprocket chains 30 and 31. Each bar 39 carries a plurality of horizontally spaced tines 41 adapted to engage peanut plants as they are elevated in spaced rows from the vicinity of the plow shares 15 and 16. In this preferred embodiment, as illustrated in FIG. 2, L-shaped members 36 form spaced links in the sprocket chains 30 and 31. A bracket 37 is attached to each member 36 and one end of a bar 39 is secured to the bracket 37 to mount the bar 39 on chains 30 and 31. Such a mounting of bars 39 below sprocket chains 30 and 31, as best shown in FIG. 2, provides for movement thereof inwardly from the path of movement of sprocket chains 30 and 31. Consequently, as explained in U.S. Pat. No. 3,319,720, the bars 39 travel more slowly as chains 30 and 31 pass over the periphery of sprocket wheels 27 and 29 and over idlers 32 and 33 than they would if they were flush with the chains thereby stripping fewer peanuts from the plant roots than would be the case with faster traveling bars.

FIG. 2 illustrates the path followed by the upper portion of the sprocket chains using chain 31 as an example. Chain 31 traverses between idler 33 and sprocket wheel 29. Idler wheel 38 is journaled to a bracket 63 extending upwardly and mounted on sub-frame 19a just above the normal path of sprocket chain 31. Idler wheel 40 is journaled to a bracket 71 mounted on sub-frame 19a below the normal path of sprocket chain 31. Chain 31 is trained between idlers 38 and 40 and is guided away from its normal path into an irregular one. Each bar 39 slows down almost to a stop as it passes over idler wheel 38 and as it moves around idler wheel 40. This motion tends to toss the plants about on the conveyor bars 39 and shake dirt therefrom. The path of travel of chain 31 illustrated in FIG. 2 is particularly advantageous when the soil is wet. When the soil is dry chain 31 may be trained over both idlers 38 and 40.

Figure 3:
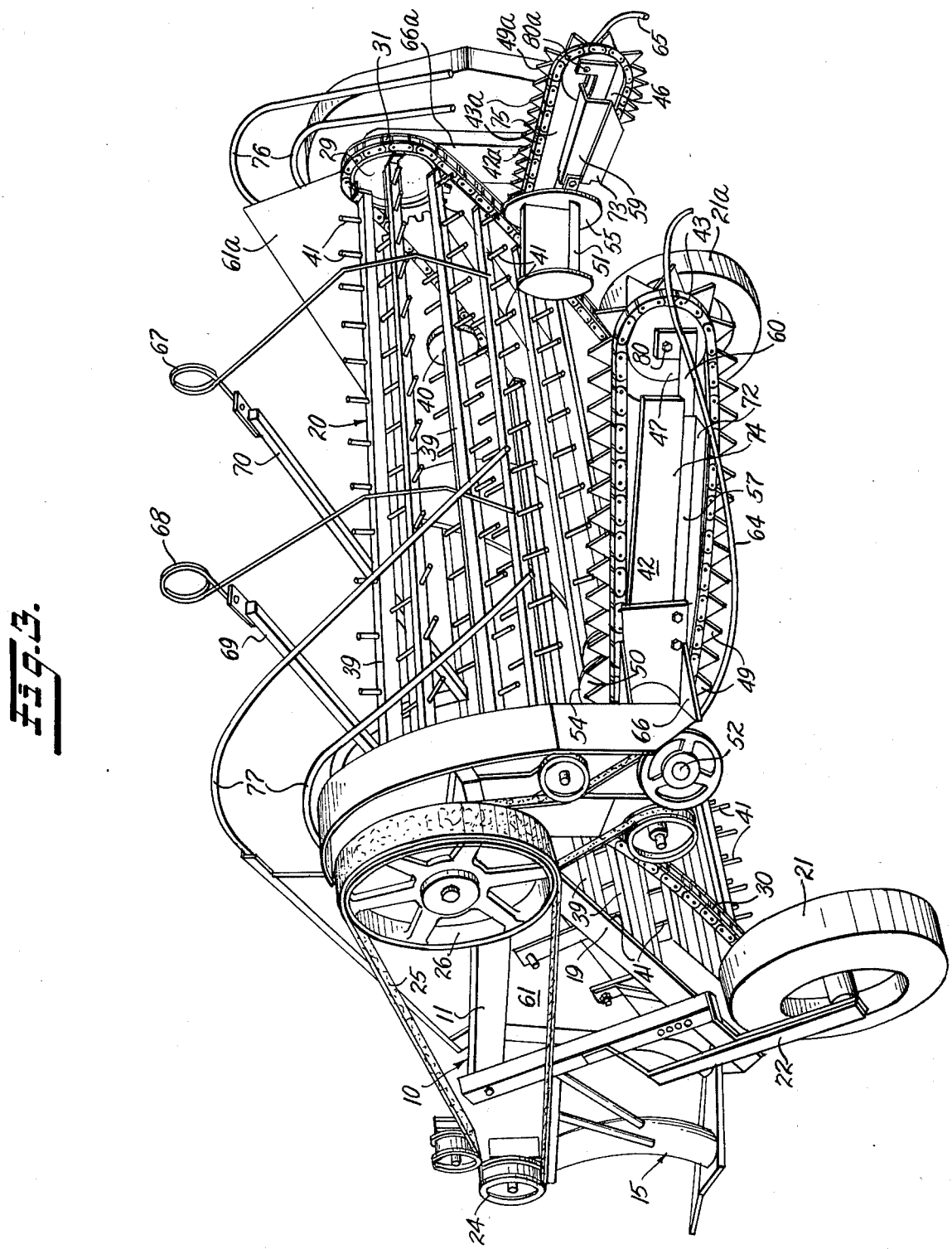
FIG. 3 is a perspective view of the rear of a digger-shaker provided with a preferred embodiment of the inverter mechanism.
Figure 4:
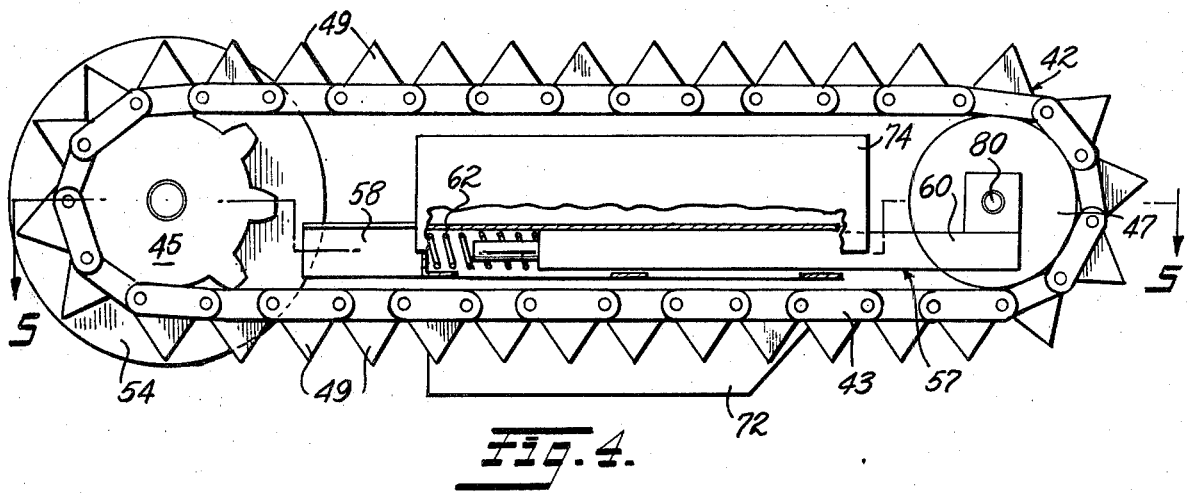
FIG. 4 is an enlarged fragmentary side elevation of one of the inverting conveyors.
Figure 5:
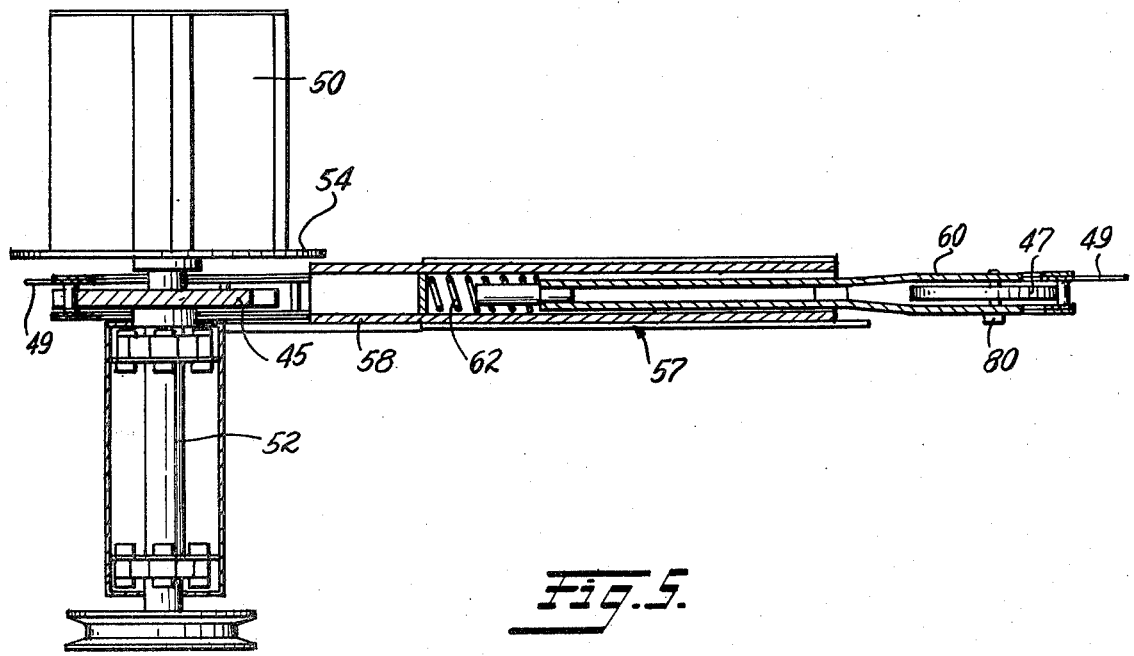
FIG. 5 is a section taken along the line 5—5 of FIG. 4.

As shown best in FIGS. 3, 4 and 5, a pair of carriers 42 and 42a are connected by brackets 66 and 66a to side rails 11 and 11a in transverse spaced relationship with each other and are disposed at the rear of the apparatus in positions where each will intercept a band of peanut laden plants as it falls from its elevated position on conveyor 20 adjacent sprocket wheel 27 or 29. Each plow assembly 15 and 16 digs one row of peanut plants. These plants are picked up by the conveyor 20 and carried in continuous bands upwardly as the chains 30 and 31 are rotated by sprocket wheels 27 and 29. One band of peanut plants moves upwardly adjacent one end of bars 39 and the other band moves upwardly near the other end. The heavier peanut laden roots are resting near the bars 39 and the foliage of the plants is extending upwardly more or less perpendicularly to the path of chains 30 and 31. Dirt clinging to the roots is shaken therefrom as the conveyor travels over its irregular path. The plants are discharged by the bars 39 at the top of the loops of chains 30 and 31 and tend to fall with their root portions extending under the foliage. Stems of the plants are caught by chain carriers 42 and 42a nearer to the roots which strike them first than to the tops of the plants. Sprocket chains 43 and 43a of carriers 42 and 42a are rotated by sprocket wheels 44 and 45 about idlers 46 and 47 spaced longitudinally therefrom. Rotary motion is imparted to sprocket wheels 44 and 45 through a pulley wheel and belt assembly connected to sheaves 26 and 48. Triangularly shaped teeth 49 and 49a have their bases secured to links in sprocket chains 43 and 43a and their apexes pointing upwardly towards the elevated end of conveyor 20. Stems of the plants become lodged between teeth 49 and 49a and are carried rearwardly as sprocket chains 43 and 43a rotate. In the meantime the foliage is unsupported and extends inwardly in a horizontal or slightly below horizontal plane between sprocket chains 43 and 43a. As sprocket chains 43 and 43a pass around idler wheels 46 and 47 the teeth spread apart and the stems are released. The plants are then discharged to the ground in continuous bands in a single windrow. The unsupported part of the plants strike the ground first so the peanuts are spaced above the ground.

Doffers 50 and 51 are mounted on and rotate with shafts 52 and 53 which drive sprocket wheels 44 and 45. Any peanut plants which are unusually heavy because of accumulation of dirt thereon will fall more or less perpendicularly from conveyor 20 and will strike doffers 50 and 51 which will shake dirt from the plants. Flanges 54 and 55 on doffers 50 and 51 lie adjacent carriers 42 and 42a and extend beyond the apex of the teeth 49. These flanges remove dirt and vines which might be clinging to the chains as they traverse through their lower portions of the loops. Doffers 50 and 51 are particularly advantageous in wet weather when dirt is most likely to cling to the plants. Spring tensioning mechanisms 56 and 57 fastened at one end by pins 80 and 80a extending through the bearings of idlers 46 and 47 and bolted at the other end to the supports for sprocket wheels 44 and 45 provide tension on the upward portion of the loops of sprocket chains 43 and 43a. Chain guards 74 and 75 are secured to tensioning mechanisms 56 and 57. Rigid rods 76 and 77 are fixedly secured to side shields 61 and 61a and extend obliquely inward beyond conveyor 20 to assist in directing the peanut plants to carriers 42 and 42a.

As shown best in FIGS. 4, 5 and 6, tensioning mechanism 57 has center arm 58 bolted to the support for sprocket wheel 45 and tension arm 60 is fastened to the pin 80 through the bearing of idler 47. Compression spring 62 urges arm 60 away from center arm 58. Tensioning mechanism 56 is similarly constructed.

Carriers 42 and 42a are disposed at acute angles with respect to the longitudinal axis of the apparatus. In this way idlers 46 and 47 are closer together than sprocket wheels 44 and 45. Hence, as the vines are carried by sprocket chains 43 and 43a they are moved closer together and are dropped at the end of the traverse of the upper portions of the chains closely together to form a single windrow. Flexible rod 64 is mounted at one end to bracket 66 and extends alongside carrier 42 to the extremity thereof and is then bent inwardly towards a similar flexible rod 65 alongside carrier 42a. These rods 64 and 65 divert any plants which tend to fall away from the windrow back into it.

Two transversely spaced vertically extending bent resilient rods 67 and 68 are fastened to support members 69 and 70 mounted on transverse member 13. Rods 67 and 68 prevent plants from being thrown beyond the posterior ends of carriers 42 and 42a.

The plants are held nearer to the roots than to their tops between teeth 49 and 49a, so the foliage portions of the plants fall inwardly and downwardly as the vines are carried backward by carriers 42 and 42a. When they reach the posterior ends of the loops of sprocket chains 43 and 43a, the bands of plants fall foliage first toward the ground. As a result, the peanut laden roots are not next to the ground and a large percentage of them are exposed at the top of the windrow.

Stripper plates 72 and 73 are secured to center arms 58 and 59 and extend downwardly along the return portion of the loop of sprocket chains 43 and 43a. Plants carried by the return portion strike the stripper and are removed thereby.

As illustrated in FIGS. 7 and 8, a plastic sleeve 35 is placed about shaft 34 in the preferred embodiment. Obviously, the apparatus can be used without such a sleeve but it is advantageous to use one on shaft 34 and also a similar one about shaft 28. The sleeve fits loosely about shaft 34 and does not normally rotate or rotates only partially with shaft 34 as the apparatus is used. Sleeve 35 protects the shaft 34 from rusting and discourages vine stems of the peanut plants from winding around shaft 34. Because it fits loosely over shaft 34 it tends to rotate away from a vine stem rather than wind it around shaft 34. The sleeve about shaft 28 rotates therewith. Preferably, the sleeve is a nylon, polyethylene, polyvinyl chloride or similar synthetic resinous or plastic tube but it may be a metal tube or any other tube which fits loosely about the shaft covered thereby.

Although the idler wheel assemblies at the forward end of the sprocket chains is combined in the preferred embodiment with an inverting apparatus, such an assembly is advantageous even when the inverter mechanism is detached from the digging apparatus and can be used to advantage on any digging apparatus having a sprocket chain driven conveyor which elevates peanut laden vines whether or not that apparatus is equipped with an inverting mechanism. Likewise, idler wheels similar to those designated 38 and 40 in the drawing may be used to advantage on a digging apparatus whether or not the apparatus has a forward idler wheel spaced inwardly on a shaft as shown or has an idler wheel adjacent the sub-frame. However, in order to avoid accumulation of weeds and vines about the front idler wheel, the construction described above with respect to idler wheels 38 and 40 should be used.

Doffers similar to those referred to as 50 and 51 are advisable on any apparatus which may be used in wet soil. Chains 43 and 43a are rotated faster than conveyor 20 so the bands of peanut plants are usually stretched between the chains and conveyor and contact chain 43 and 43a at a point spaced rearwardly from conveyor 20. However, when a plant heavy because of soil accumulation passes from conveyor 20, the band is broken and the heavy plant strikes a doffer which breaks away the soil from the plant. Hence, doffers are preferred on all embodiments of the apparatus but are not essential if the apparatus will be used only with dry soil.

Best results have been obtained so far with sprocket chain carriers having upwardly projecting teeth of the type described above. However, any other suitable rotating belt such as a conventional V-belt may be used but with somewhat less success because the plants are not transported as well by the carriers.

The shape of teeth 49 is preferably triangular or frusto-triangular because the apexes thereof separate and readily release vine stems lying therebetween as they traverse idler wheel 46 or 47. The teeth may also have a conical, elliptical, rectangular or other suitable shape. The carriers may be conventional link chains but sprocket chains are preferred. Although it is preferred to mount bars 39 on the sprocket chains with L-shaped brackets as described herein, they may be mounted so their upper surfaces are substantially flush with the top of the link of the sprocket chains but such an arrangement will lead to more peanuts being shaken from the plants.

Although the invention has been described in detail for the purpose of illustration, it is to be understood that such detail is solely for that purpose and that those skilled in the art can make variations therein without departing from the spirit and scope of the invention except as it may be limited by the claims.

What is claimed is:

1. In a peanut digging apparatus adapted to remove peanut laden plants from the soil in which they grew, elevate the plants and then discharge the plants from their elevated position to the ground in windrows behind the apparatus, means connected to the rear of the apparatus for arranging the plants in a single windrow with peanuts spaced away from the soil which comprises a pair of spaced continuous belt carriers having an upper portion adapted to intercept the plants as they fall towards the soil from their elevated positions and a lower return portion, means for rotating the carriers with the upper portion moving rearwardly from the apparatus, and means on said carriers for supporting those portions of the plants near the roots thereof and for moving the plants rearwardly with the carrier while permitting the remainder of the plants to extend unsupported between the two carriers until they are discharged to the ground at the posterior end thereof.

2. The apparatus of claim 1 wherein one carrier is mounted at one side of the rear of the digging apparatus and a second one is mounted on the opposite side and the carriers are closer together at their posterior ends than at the ends thereof which are adjacent the rear of the digging apparatus.

3. The apparatus of claim 2 wherein said carriers are sprocket chains having a plurality of upwardly extending tooth-like projections adapted for plant stems to lie therebetween.

4. The apparatus of claim 3 wherein a doffer is disposed adjacent the front end of each loop of the said chain.

5. The device of claim 3 wherein said doffer is driven by a sprocket wheel at the front end, rotates about an idler at the opposite end and is provided with a spring loaded tensioning device between the sprocket wheel and idler.

6. The apparatus of claim 5 wherein a stripper plate is disposed adjacent the lower portion of the carrier to remove plants, dirt and the like from between the tooth-like projections.

7. The apparatus of claim 5 having a flexible guide tine extending below the posterior end of each carrier and towards each other to direct peanut plants falling from the carrier into the windrow.

8. The device of claim 7 having a pair of transversely spaced guide bars extending vertically between the carriers and adapted to guide the plants to the carriers.

9. A peanut digger-shaker comprising a main frame having side rails, spaced plow assemblies supported by the main frame, a sub-frame member secured near its posterior end to each side rail and extending obliquely downwardly and forwardly therefrom and means for elevating and for removing dirt from peanut plants dug by the plow assemblies comprising a conveyor having a plurality of longitudinally spaced transversely extending bars fixedly secured at each end thereof to a sprocket chain, a transversely disposed shaft journaled for rotation on a rear elevated position of the main frame, a sprocket wheel fixedly secured on the shaft near each end thereof, a second transversely disposed shaft fixedly secured at each end thereof on a sub-frame member, an idler wheel journaled for rotation about the second shaft in a position spaced inwardly from each of the sub-frame members, a second idler wheel journaled for rotation on each of the sub-frame members above the normal path of the sprocket chain when trained only about one of the sprocket wheels and a first idler wheel, a third idler wheel journaled for rotation on each of the sub-frame members and below the normal path of the sprocket chain when trained only about one of the sprocket wheels and a first idler wheel, each of said sprocket chains being looped about one of the sprocket wheels, about one of the idler wheels, over the top of a second idler wheel and below a third idler wheel to provide an irregular path of travel for the working portion of the sprocket chain loop, and means for rotating the sprocket wheels.

10. The digger-shaker of claim 9 in combination with means for windrowing peanut plants comprising a pair of belt carriers spaced transversely from each other and having an upper portion adapted to intercept the plants as they are discharged by the said conveyor from an elevated position, and means for rotating the carriers with the upper portion thereof moving rearwardly from the digger-shaker while permitting foliage of the plants to extend unsupported between the carriers until the plants are discharged to the ground at the rear of the carriers.

11. The digger-shaker of claim 10 wherein the posterior ends of the carriers are closer together than the ends secured to the rear of the digging apparatus.

12. The digger-shaker of claim 11 wherein said carriers are sprocket chains having a plurality of upwardly extending tooth-like projections adapted for plant's stems to lie therebetween.

13. The digger-shaker of claim 12 wherein a doffer is disposed adjacent the front end of each loop of the said chain.

14. The digger-shaker of claim 10 having a flexible guide tine extending below the posterior end of each carrier and towards the other to direct peanut plants falling from the carrier into the windrow.

15. The digger-shaker of claim 10 having a pair of guide bars spaced transversely from each other and extending vertically between the carriers adapted to guide the plants to the carriers.

16. A peanut digging apparatus comprising means for removing peanut laden plants from the soil in which they grew and a conveyor for lifting the removed plants from the soil and carrying them to an elevated position, said conveyor comprising laterally spaced sprocket chains looped about a pair of wheels immediately behind the said plant removing means and sprocket wheels at the rear of the apparatus and in position elevated above the said wheels, means for driving the sprocket wheels and chains with the upper reach traveling towards the sprocket wheels, spaced bars secured to each end to the sprocket chains for supporting plants removed from the soil and carrying the plants towards the elevated position as the sprocket chains are rotated, and means between the said wheels and sprocket wheels for diverting the upper reach of the sprocket chains from generally elliptically paths and thereby increase vibration of the conveyor and removal of soil clinging to the plants comprising an idler wheel in the path of each sprocket chain which diverts the sprocket chain to a point above a generally elliptical path and a second idler wheel in the path of each chain which diverts the conveyor to a point below the generally elliptical path.

17. The apparatus of claim 16 wherein said conveyor comprises spaced bars spanning the space between said sprocket chains and secured thereto with the bars below the chain and following a path inwardly of the paths of the chains.

18. A peanut digger-shaker comprising a main frame having side rails, spaced plow assemblies supported by the main frame, a sub-frame member secured near its posterior end to each side rail and extending obliquely downwardly and forwardly therefrom and means for elevating and for removing dirt from peanut plants dug by the plow assemblies comprising a conveyor having a plurality of longitudinally spaced transversely extending bars fixedly secured at each end thereof to a sprocket chain, a transversely disposed shaft journaled for rotation on a rear elevated position of the main frame, a sprocket wheel fixedly secured on the shaft near each end thereof, a second transversely disposed shaft fixedly secured at each end thereof on a sub-frame member, an idler wheel journaled for rotation about the second shaft in a position spaced inwardly from each of the sub-frame members, a sleeve disposed loosely about the second shaft, each of said sprocket chains being looped about a sprocket wheel and idler wheel, and means for rotating the sprocket wheels.

19. A peanut digging apparatus comprising means at the front thereof for removing peanut laden plants from the soil in which they grew and a conveyor for lifting the removed plants from the soil, carrying them to an elevated position at the rear of the apparatus and discharging them therefrom, said conveyor comprising a pair of spaced sprocket chains looped about elevated drive wheels at the rear of the apparatus and idler wheels at the front of the apparatus, a frame supporting said conveyor, a shaft secured against rotation at each end to said frame just behind said digging means, said idler wheels being journaled to said shaft for rotation thereabout and spaced inwardly from the frame, whereby shielding of the idler wheels and accumulation of vines and the like thereabout are avoided, and a sleeve disposed loosely about the said shaft between the idler wheels.

* * * * *